(12) United States Patent
Rampinelli et al.

(10) Patent No.: US 11,982,330 B2
(45) Date of Patent: May 14, 2024

(54) FRICTION MATERIALS WITH LOW STORAGE TIME FOR BRAKE PADS BASED ON BINDER COMPOSITIONS AND RELATED BRAKE PADS

(71) Applicants: HeidelbergCement AG, Heidelberg (DE); Freni Brembo S.p.A., Curno (IT)

(72) Inventors: Flavio Rampinelli, Urgnano (IT); Andrea Bonfanti, Curno (IT); Alessandro Sanguineti, Curno (IT); Alessandro Samela, Curno (IT); Luca Bottalico, Brusaporto (IT)

(73) Assignees: HEIDELBERGCEMENT AG, Heidelberg (DE); FRENI BREMBO S.P.A., Curno (IT)

( * ) Notice: Subject to any disclaimer, the term of this patent is extended or adjusted under 35 U.S.C. 154(b) by 418 days.

(21) Appl. No.: 17/285,765

(22) PCT Filed: Oct. 14, 2019

(86) PCT No.: PCT/IB2019/058737
§ 371 (c)(1),
(2) Date: Apr. 15, 2021

(87) PCT Pub. No.: WO2020/079562
PCT Pub. Date: Apr. 23, 2020

(65) Prior Publication Data
US 2021/0388880 A1 Dec. 16, 2021

(30) Foreign Application Priority Data
Oct. 15, 2018 (IT) .................. 102018000009461

(51) Int. Cl.
*F16D 69/02* (2006.01)
*C04B 7/52* (2006.01)
(Continued)

(52) U.S. Cl.
CPC ............ *F16D 69/028* (2013.01); *C04B 7/527* (2013.01); *C04B 14/024* (2013.01); *C04B 14/48* (2013.01);
(Continued)

(58) Field of Classification Search
CPC .... F16D 69/028; F16D 69/027; F16D 65/095; F16D 2200/0004; F16D 2200/0034;
(Continued)

(56) References Cited

U.S. PATENT DOCUMENTS 3,349,871 A * 10/1967 Walther ............... F16D 65/092
188/73.39
4,505,753 A * 3/1985 Scheetz ............... C04B 18/146
106/725

(Continued)

FOREIGN PATENT DOCUMENTS

EP 0273181 A2 7/1988
WO 2014/203142 A1 12/2014
(Continued)

OTHER PUBLICATIONS

Gutiérrez, Dominguez, "International Search Report and Written Opinion of the International Searching Authority for International Application No. PCT/IB2019/058737," European Patent Office, Jan. 15, 2020.

*Primary Examiner* — Thomas J Williams
(74) *Attorney, Agent, or Firm* — Florek & Endres PLLC (57) ABSTRACT

A friction material with reduced storage time is described, comprising a binder composition based on a hydraulic binder and its use in brake pads and industrial applications.

20 Claims, 1 Drawing Sheet

(51) Int. Cl.
*C04B 14/02* (2006.01)
*C04B 14/48* (2006.01)
*C04B 22/06* (2006.01)
*C04B 22/14* (2006.01)
*C04B 28/02* (2006.01)
*C04B 28/04* (2006.01)
*F16D 65/092* (2006.01)
*C04B 103/10* (2006.01)
*C04B 111/00* (2006.01)

(52) U.S. Cl.
CPC ............ *C04B 22/062* (2013.01); *C04B 22/14* (2013.01); *C04B 28/021* (2013.01); *C04B 28/04* (2013.01); *F16D 65/092* (2013.01); *C04B 2103/10* (2013.01); *C04B 2111/00362* (2013.01); *F16D 2200/0065* (2013.01); *F16D 2200/0073* (2013.01)

(58) Field of Classification Search
CPC ..... F16D 2200/0069; F16D 2200/0086; F16D 2200/0095; C04B 28/04; C04B 28/08; C04B 2111/00362; C04B 22/08; C04B 22/062; C04B 2103/0088; C04B 7/527; C04B 28/021; Y02W 30/91
See application file for complete search history.

(56) References Cited

U.S. PATENT DOCUMENTS

| | | | |
|---|---|---|---|
| 4,792,361 A * | 12/1988 | Double | F16D 69/02 |
| | | | 106/644 |
| 5,433,774 A | 7/1995 | Hinterwaldner et al. | |
| 10,895,299 B2 * | 1/2021 | Alfani | F16D 69/027 |
| 2014/0261088 A1 * | 9/2014 | Bullerjhan | C04B 28/02 |
| | | | 106/789 |
| 2016/0131215 A1 * | 5/2016 | Alfani | F16D 69/027 |
| | | | 106/36 |
| 2018/0231087 A1 | 8/2018 | Alfani et al. | |
| 2021/0388880 A1 * | 12/2021 | Rampinelli | F16D 69/028 |

FOREIGN PATENT DOCUMENTS

| WO | 2017/068541 A1 | 4/2017 | |
|---|---|---|---|
| WO | WO-2017068541 A1 * | 4/2017 | ........... C04B 22/062 |

\* cited by examiner

FRICTION MATERIALS WITH LOW STORAGE TIME FOR BRAKE PADS BASED ON BINDER COMPOSITIONS AND RELATED BRAKE PADS

The present invention relates to friction materials with reduced storage time for brake pads based on binder compositions and relative brake pads.

The present invention falls within the field of friction materials for brake pads which, as is known, must have a composition which is such as to guarantee uniform and reliable performances within a wide range of operating conditions.

In particular, as disc brake pads for vehicles operate under particularly demanding operative conditions, as they must ensure reliability and, at the same time, durability, producers have constantly tried to improve the features and performances of the relative friction materials.

Brake pads consist of a support, generally metallic, and a layer that guarantees friction composed of various materials. The efficiency (i.e. the braking capacity) or duration of the pad can be favoured by suitably selecting the composition of the friction material and properties of the same material.

Friction materials have been developed in the state of the art, for example, containing steel and different types of metals in variable quantities (such as: copper, aluminium, zinc, etc.) and comprising, as binding element, thermosetting resins among which phenolic resins as such and/or modified/derivative phenolic resins (silicon, acrylic, epoxy). These thermosetting resins, present in numerous friction materials for brake pads in a percentage ranging from 5% to 20% by weight with respect to the total weight of the composition of the friction material, require a hot moulding process of the brake-pad compound and guarantee optimum final performances of the brake pad, such as: braking capacity, wear and abrasion resistance, etc.

The use of thermosetting phenolic resins, however, has various disadvantages, first of all a problem of eco-sustainability and potential toxicity. As a result of thermo-oxidative degradation during processing and also during the use of the end-product, these resins can in fact release verified toxic and/or potentially toxic substances deriving from phenol and formaldehyde, basic components of the resin. In accordance with the standard EC 1272/2008, phenol is classified as a toxic substance which can be harmful in the case of prolonged contact with the skin and class 3 mutagenic. The search for alternatives for reducing the introduction of phenols into the environment is active in numerous fields of industrial research; this problem has also been faced in the field of friction materials. Within the context of research activities for new friction materials, the applicants have filed patent applications WO 2014/203142 and WO2017/068541 in which binder compositions based on a hydraulic binder have been developed, free of thermosetting phenolic resins, and such as to guarantee uniform and reliable performance within a wide range of operating conditions.

In WO 2014/203142 a binder composition based on a hydraulic binder was developed which already completely replaces thermosetting phenolic resins, ensuring overall improved performance of the brake pad. Braking capacity, wear resistance, abrasion resistance, etc. are comparable to those of the brake pads according to the state of the art produced with binders in thermosetting resins and the tribological characteristics of the friction material according to WO 2014/203142 were determined through tests called "SAE J2522" (hereinafter indicated as "AK Master"). The AK Master test is a performance test, in which a pair of pads is tested under various braking conditions: after a running-in stage, a series of brakings are simulated at different pressures and speeds and temperatures (low, intermediate and high), and characteristic brakings, such as cold braking and motorway braking.

The material, object of patent application WO 2014/203142 brilliantly passed the AK Master test described above, also allowing the production of cementitious-based brake pads through a compression moulding process.

The material object of patent application WO 2014/203142 has proved, however, to have a poor performance when subjected to more demanding tests (for example when subjected to a tribological test called "internal high-temperature test") under more severe temperature conditions, analogous to those provided for verifying the resistance to heat and intensive use of the braking system on sports cars. This material, in fact, has significant surface delaminations under the conditions specified by the "internal high-temperature test".

The production of braking systems comprising a binder matrix based on silicates free of thermosetting organic resins, is also known from the state of the art and more specifically U.S. Pat. No. 5,433,774. These silicate-based systems, possibly with the addition of alkaline oxides and aluminates, are generally produced at low temperatures and in the absence of high pressures by means of a curing process in which a mixture of silicon oxide and other silicates, at least partially soluble in water, generate, at low temperature, a three-dimensional compact matrix. In this process, the water does not participate in the formation reaction of the braking system, but behaves exclusively as a solvent, completely evaporating. US'774 consequently already describes a friction material free of phenolic resins, as also the friction material described in WO'142, which, however, when subjected to the "internal high-temperature test" is not satisfactory with respect to performance. In patent application WO2017/068541, a binder composition or matrix based on a hydraulic binder was then identified, which allows the production of friction/braking materials and the use of said friction materials in brake pads that satisfy the necessary technical specifications, such as thermomechanical specifications, also under the conditions specified by the "internal high temperature test", at the same time ensuring high eco-sustainability.

Unlike the pads produced with phenolic resin which have a limited storage time, the pads produced with cementitious friction material, described in the patent applications indicated above, are characterized by a storage or curing time of 28 days, that is to say that the final finishing of the pad can only be carried out after a storage or curing time of 28 days. In the field of brake pads based on cementitious material, the need is particularly felt for reducing the storage or curing times, and thus accelerating the installation times, at the same time, however, keeping the mechanical properties substantially unchanged. The reduction of the storage or curing times is also particularly important for reducing the cost of the cement pads thus produced.

The present invention therefore relates to a friction material for brake pads which comprises or consists of
i) a multicomponent brake-pad compound and
ii) a binder composition or matrix based on a hydraulic binder, comprising:
  a) a hydraulic binder consisting of common cement clinker, composed for at least two thirds by mass of calcium silicates [$3CaO \cdot SiO_2$] and [$2CaO \cdot SiO_2$], the remaining part consisting of $Al_2O_3$, $Fe_2O_3$ and/or other minor oxides;

b) an activator selected from one or more salts and/or hydroxides and/or oxides of alkaline and/or alkaline earth metals and/or silicon;

c) one or more materials having a pozzolanic activity or one or more materials having a latent hydraulic activity and/or mixtures thereof, said binder composition or matrix being hardened by hydration reaction with water, characterized in that the hydraulic binder a) has a fineness, measured according to the standard UNI EN 196-6:2010, air permeability method (Blaine), ranging from 10,000 to 13,000 cm$^2$/g, more preferably from 10,500 to 12,500 cm$^2$/g and even more preferably ranging from 10,700 to 12,000 cm$^2$/g, and component c) has a fineness, measured according to the standard UNI EN 196-6:2010, air permeability method (Blaine), ranging from 6,000 to 9,000 cm$^2$/g, preferably from 6,700 to 8,000 cm$^2$/g.

The present invention also relates to brake pads consisting of a friction material comprising i) a multicomponent brake-pad compound, ii) a binder composition based on a hydraulic binder and iii) a metal support base.

A further object of the present invention is the use of said friction material in brake pads and in other industrial applications.

In testing the tribological features of the friction material according to the present invention, as already indicated, a test called "internal high-temperature test" was used as described in patent application WO2017/068541.

This test is performed on a dynamic bench, where the experimental setup is assembled, including calipers, disc and brake pad, which replicates the system fitted on the drive shaft of the vehicle selected, to which a flywheel that simulates an inertial load equivalent to the mass of the fully loaded vehicle, is connected. A first running-in phase provides 60 brake applications from 80 Km/h to 30 Km/h with a controlled deceleration of 3 m/s$^2$ and an initial disc temperature of 100° C. The test then consists of a series of brakings all with a defined initial speed, equal to 80% of the maximum speed of the vehicle and a final speed equal to 90 Km/h, with a deceleration greater than or equal to 7 m/s$^2$. A total of 25 brakings are effected, interspersed by a cooling time of 80 seconds, followed by 5 brakings under the same speed and deceleration conditions as those indicated above, effected however after cooling the system to the initial disc temperature specified above.

The friction material according to the present invention passes the test described above, as also the material according to WO'541, and proves to have a higher performance with respect to the friction material described in patent application WO'142 and in patent US'774.

Furthermore and above all, the friction material according to the present invention is characterized by storage or curing times of seven (7) days, significantly reduced with respect to the 28 days of all the cement-based friction materials of the state of the art. At the end of the seventh day, the envisaged finishing can be effected, i.e. the size adjustment of the pads and subsequent varnishing.

The binder compositions based on a hydraulic binder of the friction material object of the present invention, therefore allow better results to be obtained with respect to the cement-based friction materials of the state of the art in terms of storage or curing time, thus accelerating the installation, improving or substantially keeping the mechanical properties unchanged even under extremely severe test conditions, in addition to overall improved performances for the brake pad according to the present invention. The binder compositions according to the present invention, in fact, substantially provide the same performances in terms of friction, wear and abrasion resistance, braking capacity, durability and other characteristics, not only as a conventional product that uses materials based on thermosetting resins, but also with respect to known products that use other types of cementitious binders.

The fundamental advantage of the friction material according to the present invention, with respect to friction materials based on cementitious compositions already known in the state of the art, lies in the fact that the friction material according to the present invention is characterized by a significant reduction in the storage or curing times and therefore by an accelerated installation, at the same time passing the high-temperature test described above and thus proving to be equally or more performing than the cement-based friction materials described in the prior art previously mentioned.

The term "binder composition or matrix based on a hydraulic binder", according to the present invention, therefore refers to a material in powder form comprising, or consisting of, a hydraulic binder, an activator and one or more materials having a pozzolanic activity or one or more materials having a latent hydraulic activity and/or mixtures thereof.

The term "hydraulic binder" refers to a material in powder form which, when mixed with water, hardens by hydration regardless of the temperature conditions provided they are higher than 4° C. (at which the water is no longer in a form available for the hydration reaction) and which, after hardening, maintains its resistance and stability.

The hydraulic binder a) present in the binder composition of the friction material according to the present invention comprises any common cement clinker, as defined by the standard UNI EN 197.1:2011, i.e. a hydraulic material composed for at least two thirds by mass of calcium silicates [$3CaO \cdot SiO_2$] and [$2CaO \cdot SiO_2$], the remaining part consisting of $Al_2O_3$, $Fe_2O_3$ and other minor oxides (for example a Portland cement clinker).

Minor oxides refer to oxides of other metals normally present in common clinkers, such as magnesium and/or potassium oxides, in a minority quantity, equal to about 2-3% by weight with respect to the total weight of the cement clinker.

White, grey or pigmented cements defined according to the above-mentioned standard UNI EN 197.1:2011, together with so-called cements for retaining barriers, cementitious agglomerates and hydraulic limes, as defined in the Italian Law of May 26, 1965 N. 595, and inorganic silicates, are also included within the wide definition of hydraulic binder according to the present invention.

Preferred cements as "hydraulic binder" according to the present invention are Portland cement type I, a blast-furnace cement type III, a pozzolan cement type IV and mixtures thereof.

The "hydraulic binder" a) is therefore preferably a Portland cement type I, a blast-furnace cement type III, a pozzolan cement type IV and mixtures thereof, and has a fineness, measured according to the standard UNI EN 196-6:2010 air permeability method (Blaine), ranging from 10,000 to 13,000 cm$^2$/g, more preferably from 10,500 to 12,500 cm$^2$/g and even more preferably ranging from 10,700 to 12,000 cm$^2$/g.

The selection of these particular types of cement, in fact, allows the thermal stability and mechanical resistance to be further increased, which are maximum in the case of Portland cement type I ground to a preferred fineness ranging from 10,700 to 12,000 cm²/g.

The binder composition ii) based on a hydraulic binder according to the present invention also comprises a component b) which is an activator selected from one or more salts and/or hydroxides and/or oxides of alkaline and/or alkaline-earth metals and/or of silicon. The salts and/or hydroxides and/or oxides of alkaline, alkaline-earth metals and/or silicon can be added in powder form or in a solution with different concentrations Examples of these substances are: silicon oxide, potassium oxide, sodium oxide, potassium hydroxide, sodium hydroxide and silicates. Preferred examples of these substances are: silicon oxide, potassium oxide, potassium hydroxide and silicates. The binding composition ii) based on a hydraulic binder according to the present invention must also comprise a component c) consisting of one or more materials having a pozzolanic activity, such as, preferably, microsilica, fly ash, pozzolan, silica fume, metakaolin, and/or one or more materials having a latent hydraulic activity, such as blast-furnace slag; hydrated calcium; natural limestones.

Component c) has a fineness, measured according to the standard UNI EN 196-6: 2010 air permeability method (Blaine), ranging from 6,000 to 9,000 cm²/g, preferably from 6,700 to 8,000 cm²/g.

The preferred component c) of the binder composition according to the present invention is selected from blast furnace slag or metakaolin, preferably with a fineness ranging from 6,700 to 8,000 cm²/g.

A non-limiting example of blast-furnace slag is that having the following chemical composition (XRD analysis):

| RX Spectrophotometric Analysis | |
|---|---|
| Silicon Oxide ($SiO_2$) | 33.04 |
| Aluminium oxide ($Al_2O_3$) | 10.85 |
| Iron Oxide ($Fe_2O_3$) | 1.93 |
| Calcium Oxide (CaO) | 42.56 |
| Magnesium Oxide (MgO) | 7.01 |
| Sulfates ($SO_3$) | 2.82 |
| Potassium Oxide ($K_2O$) | 0.23 |
| Sodium Oxide ($Na_2O$) | 0.43 |
| Titanium Oxide ($TiO_2$) | 0.47 |
| Phosphorous Oxide ($P_2O_5$) | 0.08 |
| Manganese Oxide ($Mn_2O_3$) | 0.30 |

The fineness of the mixture obtained by mixing the hydraulic binder a) and component c), measured according to the UNI EN 196-6: 2010 air permeability method (Blaine), ranges from 8,000 to 11,000 cm²/g, preferably from 9,400 to 9,800 cm²/g, more preferably 9,500 cm²/g.

For the purposes of the present invention, the binder composition ii) based on a hydraulic binder, can also comprise aggregates.

Said aggregates, or inert products, also called inert aggregates, can be selected from calcareous, silica or silico-calcareous aggregates, defined according to the standards UNI EN 13139:2003 and UNI EN 12620:2008. The aggregates can be suitably selected from calcareous aggregates, of quartz, or silico-calcareous aggregates in any form, crushed or spherical. Said aggregates can comprise one or more fillers of a mineral origin, for example calcareous, silica or silico-calcareous fillers or quartz, having a fine particle size according to the definition of the standard UNI EN 13139: 2003.

For the purposes of the present invention, the binder composition ii) based on a hydraulic binder can also contain a waterproofing or water-repellent agent or additive. Said agents comprise a wide variety of compounds of an organic nature, such as silanes.

In addition to the above components, the binder composition ii) based on a hydraulic binder present in the friction material object of the present invention, can comprise various other additives for adapting the characteristics of the mixture to the specific requirements. Examples of these additives can be superfluidifying agents, preferably of the polycarboxylic type, anti-shrinkage agents, hardening and/or setting accelerators, rheology modifiers or modifiers of physical-mechanical properties, such as, for example, celluloses or latexes, expansion agents, aerating, deaerating and adhesion agents. These additives are optional for the purposes of the invention.

The binder composition ii) based on a hydraulic binder is present in a quantity ranging from 3 to 60% by weight with respect to the total weight of the mixture forming the friction material, and is preferably present in a quantity ranging from 5 to 52% by weight with respect to the total weight of the mixture forming the friction material (given by the sum of components i) and ii)).

The preferred quantity of 5 to 52% by weight with respect to the total weight of the mixture forming the friction material allows an optimum friction material to be obtained with respect to the mechanical seal characteristics in the shear process and under thermo-oxidative conditions.

In said binder composition ii) based on a hydraulic binder, the hydraulic binder a) is present in a quantity ranging from 0.5 to 95% by weight, preferably from 10 to 93% by weight, with respect to the total weight of the binder composition ii), the activator b) is present in a quantity ranging from 0.5 to 50% by weight with respect to the total weight of the binder composition ii), the materials having a pozzolanic activity and/or latent hydraulic activity c), when provided, are present in a quantity ranging from 0.5 to 95% by weight, preferably from 10 to 93% by weight, with respect to the total weight of the binder composition ii), possible aggregates are present in a quantity ranging from 0 to 20% by weight with respect to the total weight of the binder composition ii), possible additives of a different nature are present in a quantity ranging from 0 to 5% by weight with respect to the total weight of the binder composition ii).

The optimal weight ratio between hydraulic binder a) and materials having a pozzolanic activity and/or latent hydraulic activity c), ranges from 75:25 to 60:40, preferably equal to 65:35.

Furthermore, in the binder composition ii) based on the preferred hydraulic binder according to the present invention, the hydraulic binder a) is type I Portland cement with a fineness ranging from 10,000 and 13,000 cm²/g, and the materials having pozzolanic activity and/or hydraulic c) are blast furnace slag with a fineness that varies between 6,000 and 9,000 cm²/g, in a weight ratio equal to 65/35.

For the purposes of the present invention, the total water added, necessary for the hardening process of the hydraulic binder, is in a quantity ranging from 25 to 150% by weight with respect to the total weight of the binder composition based on a hydraulic binder ii), preferably in a quantity ranging from 50 to 150% by weight.

A part of the water is eliminated in the initial pressing phase during the moulding step of the pad.

More specifically, the binder composition ii), whose quantity ranges from 3 to 60% by weight, is composed of components a), b) and c) and, possibly, of the aggregates and additives indicated above with reference to the binder composition. The quantity of water therefore ranges from 25 to 150% with respect to the total weight of said binder composition.

The friction material according to the present invention is a material which, in addition to the binder composition ii) and water necessary for the hardening process, also comprises a "Multicomponent Brake-pad Compound" i), comprising or consisting of: fibers, lubricants, abrasives, friction modifiers and/or other additional materials.

The friction material according to the present invention, in addition to the binder composition ii) based on a hydraulic binder present in a quantity ranging from 3 to 60% by weight with respect to the total weight of the mixture forming the friction material and water in a quantity ranging from 25 to 150% by weight with respect to the total weight of the binder composition based on a hydraulic binder ii), also comprises a multicomponent brake-pad compound i) in a quantity ranging from 30 to 97% by weight, preferably from 50 to 95%, with respect to the total weight of the mixture forming the friction material.

The multicomponent brake-pad compound i) of the friction material according to the present invention comprises at least one lubricant in a quantity ranging from 5 to 15% by weight, at least one abrasive in a quantity ranging from 8 to 25% by weight, at least one component containing carbon in a quantity ranging from 8 to 25% by weight, at least one modifier in a quantity ranging from 15 to 30% by weight, all percentages being calculated with respect to the total weight of the multicomponent brake-pad compound i).

The multicomponent brake-pad compound i) of the friction material according to the present invention can optionally comprise one or more fibers in a quantity ranging from 2 to 30% by weight with respect to the total weight of the multicomponent brake-pad compound i).

Possible examples of fibers, from which the fiber used in the multicomponent brake-pad compound i) of the friction material according to the present invention is selected, can be: fibers based on polyacrylonitrile, polyamides, cellulose fibers, metal fibers, ceramic fibers, glass fibers, synthetic mineral fibers such as hardwool, slagwool and rockwool, steel fibers and carbon fibers.

Possible examples of lubricants, from which the lubricant used in the multicomponent brake-pad compound i) of the friction material according to the present invention is selected, can be organic lubricants and metal lubricants, mixtures of metal sulfides (such as tin sulfides, zinc sulfide, iron sulfides and molybdenum sulfide), boron nitride, tin powder and zinc powder.

The lubricant is preferably selected from metal sulfides.

Possible examples of abrasives, generally classified on the basis of their Mohs hardness, from which the abrasive used in the multicomponent brake-pad compound i) of the friction material according to the present invention is selected, can be mineral fibers, zirconium oxide, zircon, zirconium silicate, mica, alumina, silicate minerals, magnesium, zirconium and/or aluminum silica, silicon dioxide, sand, silicon carbide, iron oxide, iron chromite, magnesium oxide and potassium.

The abrasive in the friction material according to the present invention is preferably selected from metal oxides and other abrasives having a hardness according to the Mohs scale, higher than 6.

Possible examples of a component containing carbon, from which said component of the multicomponent brake-pad compound i) of the friction material according to the present invention is selected, can be natural graphite, synthetic graphite, petroleum coke, desulfurized petroleum coke and carbon black.

The above-mentioned component containing carbon is preferably selected from graphites and coke.

Possible examples of modifiers, from which the modifiers of the multicomponent brake-pad compound i) of the friction material according to the present invention are selected, can be lime, calcium oxide, calcium hydroxide, talc, calcium carbonate, calcium silicate, barite, fluorinated compounds, metal powders, rubber in powder form or recycled rubber in pieces) and various other types of friction powders.

The modifier is preferably selected from barite and metal powders.

A preferred friction material according to the present invention consists of
  ii) a binder composition based on: a) Portland cement type I 52.5, with a fineness of 11,840 $cm^2/g$, b) potassium silicate and potassium hydroxide alone or in a mixture, or sodium hydroxide, c) slag with a fineness of 6,760 $cm^2/g$, and water and
  i) a multicomponent brake-pad compound comprising components preferably selected from metal oxides, steel fibres, aramid fibers, chromite, metal sulfides, graphite, coke, metal powders and barite.

Preparation Process

The various components listed above, and specifically the binder composition ii), the multicomponent brake-pad compound i) and water, form the friction material and, when mixed in the manner and proportions suggested, provide a class of friction materials with higher performances with respect to those of the cementitious materials according to the state of the art.

For a complete homogenization, the cement, water, and other components forming the friction material are mixed, in the appropriate proportions, until a homogeneous, lump-free paste is obtained, having a suitable consistency, which is then subjected to the moulding process for the production of brake pads.

The braking mixture thus obtained is subsequently subjected to a compression moulding process at a temperature ranging from 4 to 90° C., preferably from 20 to 25° C., and a pressure ranging from 1 to 6 $kN/cm^2$, preferably from 2 to 5 $kN/cm^2$, said temperature and pressure conditions having proved to be optimum for the moulding of brake pads starting from the friction materials according to the present invention.

After about 7 days of curing or storage subsequent to moulding, the pads are characterized and tested as indicated hereunder.

The characterization of the pads produced with the moulding process with the preselected formulations is based on an evaluation of the following aspects:
  A) uniformity and regularity of the profile of the edges and absence of shape defects;
  B) compressibility and surface hardness;
  C) tribological characteristics of the friction material, determined through tests called AK Master and "internal high-temperature test".

The characterizations A) and B) are effected by means of the following tests:
  A) uniformity and regularity of the profile of the edges and absence of shape defects: this is basically an evaluation of the moulding test that consists in observing the following parameters: A1) homogenous filling of the mould with the material with the consequent production of a product free from defects; A2) observation of possible surface oxidations or abnormal bulges. These observations are effected by means of a visual verification and by means of a flatness and parallelism measurement of the end-product.

B) "compressibility" according to ISO-6310 and "surface hardness" according to JIS D4421; the compressibility and surface hardness respectively provide an indication of the dimensional variation under compression regime and a homogeneity index of the mechanical properties between peripheral areas and the central part of the surface of the pad.

For a friction material, acceptable compressibility values according to the standard ISO-6310, are values within the range of 20 to 120 microns, whereas acceptable surface hardness values (HRR) according to the standard JIS D4421, are values within the range of 10 to 120.

C) Tribological characteristics

The tribological characteristics of the friction material are determined through tests called SAE J2522 (called "AK Master") and "internal high-temperature test".

The AK Master test is a performance test, in which a pair of pads are tested under various braking conditions: after a running-in stage, a series of brakings are simulated at different pressures and speeds (low, intermediate and high), and characteristic brakings, such as cold braking and motorway braking.

The "internal high-temperature test" is carried out on dynamic bench, where the experimental setup is assembled, including calipers, disc and brake pad, which replicates the system fitted on the drive shaft of the vehicle selected, to which a flywheel that simulates an inertial load equivalent to the mass of the fully loaded vehicle, is connected. A first running-in phase provides for 60 brakings from 80 Km/h to 30 Km/h with a controlled deceleration of 3 m/s$^2$ and an initial disc temperature of 100° C. The test then consists of a series of brakings all with a defined initial speed, equal to 80% of the maximum speed of the vehicle and a final speed equal to 90 Km/h, with a deceleration greater than or equal to 7 m/s$^2$. A total of 25 brakings are effected, interspersed by a cooling time of 80 seconds, followed by 5 brakings under the same speed and deceleration conditions as those indicated above, effected however after cooling the system to the initial disc temperature specified above.

The main advantage of the friction material according to the present invention is that it allows brake pads to be produced, having a much higher eco-sustainability, as there is no release, in fact, of phenolic or phenol-formaldehyde derivatives into the atmosphere, either during use or during production. Furthermore, thanks to the particular characteristics of the binder compositions according to the present invention, they guarantee analogous performances to those of a material containing phenolic resins and analogous or higher performances than those of a material containing a cementitious binding material such as that described in the prior art indicated above.

A fundamental advantage of the friction material according to the present invention is linked to the storage/curing time of only 7 days which makes the setup and use of the pad much faster and, surprisingly, despite the very short curing time, the mechanical properties of the friction material according to the present invention remain substantially unchanged.

Further features and advantages of the invention will appear evident from the following examples provided for illustrative and non-limiting purposes.

EXAMPLE 1

A friction material s prepared, having the composition indicated in Table 1 hereunder.

TABLE 1

| Constituents | wt. % |
|---|---|
| Hydraulic binder based on Portland Cement type I 52.5R Calusco with a fineness of 11,840 cm$^2$/g (blaine) and | 6.3% |
| slag | 3.5% |
| Alkaline solution (KOH 11.5M and H$_2$O in a ratio of 1:3) | 11.5% |
| Multicomponent brake-pad compound: | |
| Abrasives: Aluminium oxides and Chromite | 8.6% |
| Carbonaceous components: Coke and Graphites | 16.3% |
| Lubricants: Tin and molybdenum sulfides | 6.7% |
| Metal Fibers: Steel Fibers | 24% |
| Modifiers and fillers: metal powders and barite | 23.1% |

More specifically, the friction material was prepared using a binder composition in a percentage equal to 10.1% by weight with respect to the total weight of the friction material, containing a Portland cement type I 52.5R Calusco, superground to a fineness equal to about 11,840 cm$^2$/g (blaine) and blast furnace slag with a fineness equal to approximately 6,760 cm$^2$/g.

The cement constitutes 65% by weight of the binder composition, whereas the slag constitutes about 35% by weight of the binder composition.

The resulting mixture therefore has a fineness equal to 9,500 cm$^2$/g.

Figure 1:
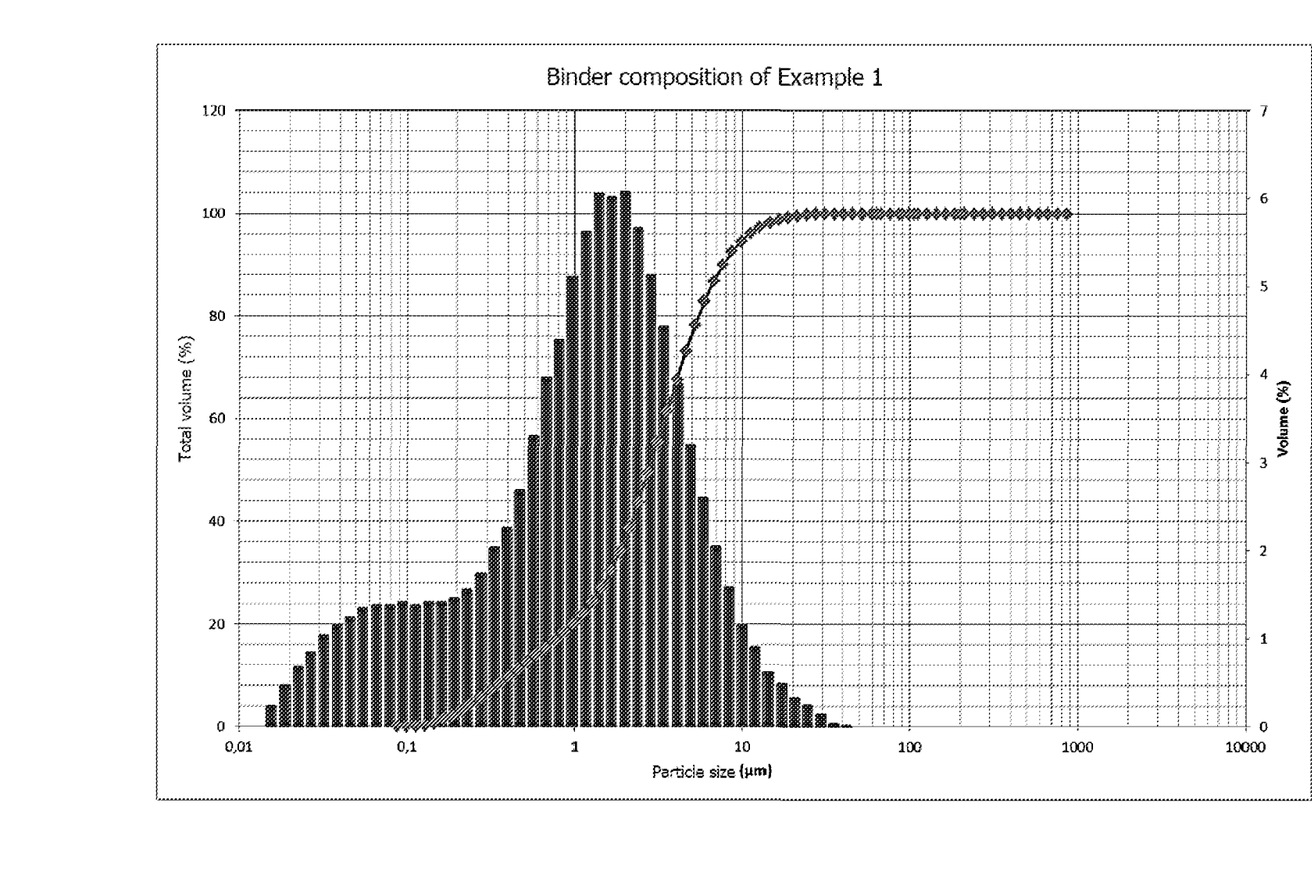

The particle-size distribution of the binder composition is shown in FIG. 1, whereas the granulometric data with Laser grinding are shown in Table 2, including the inclinations and position parameters x' and n according to the Rosin-Rammler-Sperling-Bennet (RRSB) function. Table 3 shows the physical-mechanical properties of the binder composition according to the standard EN13892-2: 2005.

TABLE 2

| | D10 (μm) | D50 (μm) | D90 (μm) | Blaine (cm$^2$/g) | x' | n |
|---|---|---|---|---|---|---|
| Binder composition Example 1 | 0.42 | 2.79 | 7.67 | 9740 | 3.76 | 1.08 |

TABLE 3

| | | | Binder composition |
|---|---|---|---|
| Consistency of the cement paste | EN 196-3: 2010 | % | 36 |
| Initial setting time | EN 196-3: 2010 | min | 80 |
| Final setting time | | min | 170 |
| Consistency of the mortar | UNI 7044: 1972 | | 42 |
| Mechanical resistance to compression Rck 2 days | EN 13892-2: 2005 | | 32.9 |
| Mechanical resistance to compression Rck 7 days | EN 13892-2: 2005 | | 52.6 |
| Mechanical resistance to compression Rck 28 days | EN 13892-2: 2005 | | 70.2 |
| Mechanical flexural strength (2 days) | EN 13892-2: 2005 | MPa | 5.4 |
| Mechanical flexural strength (7 days) | EN 13892-2: 2005 | MPa | 7.5 |
| Mechanical flexural strength (28 days) | EN 13892-2: 2005 | MPa | 7.6 |
| Specific surface area (Blaine Fineness) | EN 196-6: 2010 | | 9740 |

The friction material thus produced was moulded by means of suitable compression moulds, under room-temperature conditions (20-25° C.) and a pressure at 4.5 kN/cm², leading to the production of a pad having a surface of 77 cm², and a thickness of 1.5 cm.

More specifically, the moulds used in the tests indicated in the present example are moulds which provide for the production of a pad having a surface of 77 cm², and a thickness of 1.5 cm.

Approximately 7 days after moulding (curing time), the pads were varnished according to the usual methods and then characterized and tested as described hereunder.

The pads obtained from the formulation indicated in table 1 were observed visually and do not show either surface oxidations or abnormal bulges.

HRR surface hardness tests of the end-product thus obtained were then carried out according to the standard JIS D4421, obtaining an average value of 80, also indicating a good homogeneity of the mechanical properties between peripheral and central surface areas of the pad.

This aspect of homogeneity is extremely important for producing a friction material that does not have potential detachment points and is characterized by a high wear resistance.

Uniformity and regularity of the profile of the edges and homogeneity of the central part of the pad with respect to the peripheral areas are essential elements for having an analogous or improved wear of the pad with respect to the values typical of pads that use phenolic resins as binders.

The "Compressibility" tests according to ISO-6310:2009 showed an average value equal to 35.6 microns.

The pads, tested according to the AK Master test, showed wear values of 0.30 mm (this value refers to the average of the measurements effected on the pair of pads), an average friction coefficient equal to 0.37, whereas the appearance of the pads and discs proved to be visually acceptable with respect to the standard represented by traditional pads obtained with thermosetting resins.

The pads tested according to the "internal high-temperature test" described above do not show any detachment of material by delaminations and/or extensive and significant cracks at the end of the test.

EXAMPLE 2 (COMPARISON)

A friction material was prepared with the same composition indicated in Table 1 of Example 1.

More specifically, the friction material was prepared using a binder composition in a percentage equal to 10.1% by weight with respect to the total weight of the friction material, containing a Portland cement type I 52.5R Calusco, superground to a fineness equal to about 6,100 cm²/g (blaine) and blast furnace slag with a fineness equal to about 3,900 cm²/g.

The cement constitutes 65% by weight of the binder composition, whereas the slag constitutes about 35% by weight of the binder composition.

The resulting mixture therefore has a fineness equal to 5,430 cm²/g.

The granulometric data with Laser grinding are indicated in Table 4, including the inclinations and position parameters x' and n according to the Rosin-Rammler-Sperling-Bennet (RRSB) function. Table 5 shows the physical-mechanical properties of the binder composition according to the standard EN13892-2: 2005.

TABLE 4

| | D10 (μm) | D50 (μm) | D90 (μm) | Blaine (cm²/g) | x' | n |
|---|---|---|---|---|---|---|
| Binder composition Example 2 | 0.88 | 7.34 | 25.2 | 5430 | 10.64 | 0.93 |

TABLE 5

| | | | Binder composition |
|---|---|---|---|
| Consistency of the cement paste | EN 196-3: 2010 | % | 30 |
| Initial setting time | EN 196-3: 2010 | min | 175 |
| Final setting time | | min | 240 |
| Consistency of the mortar | UNI 7044: 1972 | | 83 |
| Mechanical resistance to compression Rck 2 days | EN 13892-2: 2005 | | 29.6 |
| Mechanical resistance to compression Rck 7 days | EN 13892-2: 2005 | | 41.8 |
| Mechanical resistance to compression Rck 28 days | EN 13892-2: 2005 | | 58.1 |
| Mechanical flexural strength (2 days) | EN 13892-2: 2005 | MPa | 5.3 |
| Mechanical flexural strength (7 days) | EN 13892-2: 2005 | MPa | 6.2 |
| Mechanical flexural strength (28 days) | EN 13892-2: 2005 | MPa | 7.4 |
| Initial setting time | EN 196-6: 2010 | | 5430 |

The remaining part of the friction material consists of the Multicomponent brake-pad compound.

The percentage quantities of each component of the friction material are fractions by weight with respect to the total weight of the mixture which constitutes the friction material alone.

The friction material thus produced was moulded by means of suitable compression moulds, under room-temperature conditions (20-25° C.) and a pressure at 4.5 kN/cm², leading to the production of a pad having a surface of 77 cm², and a thickness equal to 1.5 cm.

More specifically, the moulds used in the tests indicated in the present example are moulds which provide for the production of a pad having a surface of 77 cm², and a thickness equal to 1.5 cm Approximately 28 days after moulding (curing time), the pads were varnished according to the usual methods and then characterized and tested as described hereunder. It was impossible to carry out the characterization of the pads before 28 days The pads obtained from the formulation indicated in table 1 were observed visually and do not show either surface oxidations or abnormal bulges.

HRR surface hardness tests of the end-product thus obtained were then carried out according to the standard JIS D4421, obtaining an average value of 90, also indicating a good homogeneity of the mechanical properties between peripheral and central surface areas of the pad.

This aspect of homogeneity is extremely important for producing a friction material that does not have potential detachment points and is characterized by a high wear resistance.

Uniformity and regularity of the profile of the edges and homogeneity of the central part of the pad with respect to the peripheral areas are essential elements for having an analogous or improved wear of the pad with respect to the values typical of pads that use phenolic resins as binders.

The "Compressibility" tests according to ISO-6310:2009 showed an average value equal to 30 microns.

The pads, tested according to the AK Master test, showed wear values of 0.30 mm (this value refers to the average of the measurements effected on the pair of pads), an average friction coefficient equal to 0.36, whereas the appearance of the pads and discs proved to be visually acceptable with respect to the standard represented by traditional pads obtained with thermosetting resins.

On analyzing the results of Examples 1 and 2, it can be noted that the pads of Example 1, i.e. obtained starting from a binder composition with a fineness equal to 9,740 cm$^2$/g, showed a slight improvement in the physical-mechanical performances with respect to the pads of Example 2, i.e. obtained starting from a binder composition with a fineness equal to 5,430 cm$^2$/g, but, very surprisingly, the result of the AK master test after only 7 days of storage or curing (friction coefficient and wear of the pads) is completely analogous to that obtained for the pads of Example 2 which require a curing or storage time of 28 days.

The invention claimed is:

1. A friction material composition for brake pads comprising:
   i) a multicomponent brake-pad compound; and
   ii) a binder composition or matrix based on a hydraulic binder, comprising:
      a) a hydraulic binder consisting of common cement clinker, composed for of at least two thirds by mass of calcium silicates [$3CaO\cdot SiO_2$] and [$2CaO\cdot SiO_2$], the remaining part consisting of at least one of $Al_2O_3$, $Fe_2O_3$, MgO and $K_2O$, wherein said hydraulic binder a) has a fineness, measured according to the standard UNI EN 196-6:2010, air permeability method (Blaine), ranging from 10,000 to 13,000 cm$^2$/g;
      b) an activator selected from one or more salts and/or hydroxides and/or oxides of alkaline and/or alkaline earth metals and/or silicon; and
      c) one or more materials having a pozzolanic activity, one or more materials having a latent hydraulic activity and mixtures thereof, wherein component c) has a fineness, measured according to the standard UNI EN 196-6:2010, air permeability method (Blaine), ranging from 6,000 to 9,000 cm$^2$/g,
   said binder composition or matrix being hardened by means of hydration reaction with water.

2. The friction material composition according to claim 1, wherein the hydraulic binder a) is taken from the group consisting of type I Portland cement clinker, type III blast furnace cement, type IV pozzolanic cement and mixtures thereof.

3. The friction material composition according to claim 1, wherein component b) of the binder composition ii) is selected from silicon oxide, potassium oxide, sodium oxide, potassium hydroxide, sodium hydroxide and/or silicates.

4. The friction material composition according to claim 1, wherein component c) of the binder composition ii) is selected from one or more materials having a pozzolanic activity and/or one or more materials having a latent hydraulic activity.

5. The friction material composition according to claim 1, wherein the binder composition ii) based on hydraulic binder is present in a quantity ranging from 3 to 60% by weight with respect to the total weight of the mixture constituting the friction material composition.

6. The friction material composition according to claim 1, wherein the hydraulic binder a) is present in a quantity ranging from 0.5 to 95% by weight with respect to the total weight of the binder composition ii), the activator b) is present in a quantity ranging from 0.5 to 50% by weight with respect to the total weight of the binder composition ii), the materials having a pozzolanic and/or latent hydraulic activity c) are present in a quantity ranging from 0.5 to 95% by weight with respect to the total weight of the binder composition ii), possible aggregates are present in a quantity ranging from 0 to 20% by weight with respect to the total weight of the binder composition ii), possible additives of various types are present in a quantity ranging from 0 to 5% by weight with respect to the total weight of the binder composition ii).

7. The friction material composition according to claim 1, wherein the total water added is within a quantity ranging from 25 to 150% by weight with respect to the total weight of the binder composition based on hydraulic binder ii).

8. The friction material composition according to claim 1, wherein the multicomponent brake-pad compound i) is present in a quantity ranging from 30 to 97% by weight, preferably from 50 to 95% with respect to the total weight of the mixture constituting the friction material composition.

9. The friction material composition according to claim 1, wherein the multicomponent brake-pad compound i) comprises at least one lubricant in a quantity ranging from 5 to 15% by weight, at least one abrasive in a quantity ranging from 8 to 25% by weight, at least one component containing carbon in a quantity ranging from 8 to 25% by weight, at least one modifier in a quantity ranging from 15 to 30% by weight, all the quantities being calculated with respect to the total weight of the multicomponent brake-pad compound i).

10. The friction material composition according to claim 1, wherein the friction material composition consists of:
   i) a multicomponent brake-pad compound comprising components selected from metal oxides, steel fibers, aramid fibers, chromite, metal sulfides, graphite, coke, metal powders and barite; and
   ii) a binder composition based on: a) type I Portland cement 52.5, with a fineness of 11,840 cm$^2$/g, b) potassium silicate and potassium hydroxide alone or in a mixture or sodium hydroxide, c) slag with a fineness of 6,760 cm$^2$/g, and water.

11. Brake pads consisting of a friction material obtained from a friction material composition according to claim 1 and a metal support base.

12. Use of a friction material composition comprising a binder composition based on a hydraulic binder and a multicomponent brake-pad compound according to claim 1, for brake pads and other industrial applications.

13. The friction material composition according to claim 1, wherein the hydraulic binder a) has a fineness, measured according to the standard UNI EN 196-6:2010, air permeability method (Blaine), ranging from 10,500 to 12,500 cm$^2$/g.

14. The friction material composition according to claim 1, wherein the hydraulic binder a) has a fineness, measured according to the standard UNI EN 196-6:2010, air permeability method (Blaine), ranging from 10,700 to 12,000 cm$^2$/g.

15. The friction material composition according to claim 1, wherein component c) has a fineness, measured according to the standard UNI EN 196-6:2010, air permeability method (Blaine), ranging from 6,700 to 8,000 cm$^2$/g.

16. The friction material composition according to claim 2, wherein the hydraulic binder a) is type I Portland cement clinker.

17. The friction material composition according to claim 3, wherein component b) of the binder composition ii) is selected from silicon oxide, potassium oxide, potassium hydroxide and/or silicates.

18. The friction material composition according to claim 4, wherein component c) of the binder composition ii) is selected from one or more materials comprising microsilica, fly ashes, pozzolan, silica fume, metakaolin, blast furnace slag, hydrated limes, natural limestones.

19. The friction material composition according to claim 5, wherein the binder composition ii) based on hydraulic binder is present in a quantity ranging from 5 to 52% by weight with respect to the total weight of the mixture constituting the friction material composition.

20. The friction material composition according to claim 6, wherein the hydraulic binder a) is present in a quantity ranging from 10 to 93%, by weight with respect to the total weight of the binder composition ii), and the materials having a pozzolanic and/or latent hydraulic activity c) are present in a quantity ranging from 10 to 93%, by weight with respect to the total weight of the binder composition ii).

\* \* \* \* \*